United States Patent [19]
Brown et al.

[11] Patent Number: 5,289,112

[45] Date of Patent: * Feb. 22, 1994

[54] LIGHT-EMITTING DIODE ARRAY CURRENT POWER SUPPLY INCLUDING SWITCHED CASCODE TRANSISTORS

[75] Inventors: Charles A. Brown; Billy E. Thayer; Rajeev Badyal, all of Corvallis, Oreg.

[73] Assignee: Hewlett-Packard company, Palo Alto, Calif.

[*] Notice: The portion of the term of this patent subsequent to Mar. 24, 2009 has been disclaimed.

[21] Appl. No.: 948,274

[22] Filed: Sep. 21, 1992

[51] Int. Cl.$^5$ ................................................ G05F 3/26
[52] U.S. Cl. .................................. 323/315; 323/316; 323/317; 307/296.6; 307/296.1; 346/108; 354/4; 354/7
[58] Field of Search ......................... 323/311-316, 323/317; 307/296.1, 296.6, 296.8, 31-33, 38; 346/107 R, 108, 139 R, 154; 354/5, 7

[56] References Cited

U.S. PATENT DOCUMENTS

| | | |
|---|---|---|
| 4,780,731 | 10/1988 | Creutzmann et al. ............ 364/108 |
| 4,864,216 | 9/1989 | Kalata et al. ..................... 323/315 |
| 5,009,192 | 3/1992 | Thayer et al. .................... 323/315 |
| 5,166,702 | 11/1992 | Mattern et al. ................. 346/107 R |

Primary Examiner—Steven L. Stephan
Assistant Examiner—Adolf D. Berhane

[57] ABSTRACT

A programmable power supply for driving LEDS is disclosed that includes a reference current leg and a number of output current legs. Both the reference current leg and the output current legs are further comprised of a plurality of parallel driver FET-control FET pairs, in which the driver and control FETs are connected in series. The driver FETs are biased by a reference voltage that provides a predetermined maximum output current. The control FETs are individually selected to provide a controlled output current. The individual control voltage is either a positive voltage, which disables the control FET, or a predetermined cascode voltage that places the control FET at or into the high output impedance saturation conduction region. By placing the control FETs into the saturation region, the output current is substantially insensitive to voltage fluctuations at the output 8 Claims, 2 Drawing Sheets

LIGHT-EMITTING DIODE ARRAY CURRENT POWER SUPPLY INCLUDING SWITCHED CASCODE TRANSISTORS

BACKGROUND OF THE INVENTION

The present invention relates generally to light-emitting diode array power supplies and more particularly to such supplies that use an operational amplifier to regulate a constant current source. This application is related to my co-pending patent application entitled "Precision Reference Current Generator", Ser. No. 07/944,852.

In electrophotographic ("EP") printers images are formed by selectively discharging a photoreceptor surface and then attracting oppositely charged toner to the remaining charged surface. One means for discharging the photoreceptor is with an array of light-emitting diodes ("LEDs"), where the array is comprised of individual LEDs spanning the width of the photoreceptor surface. The quality of the image is directly influenced by the LED's ability to provide consistent and uniform light to the photoreceptor. The consistency and uniformity of the light produced by the LEDs is a function of the stability of the current supplied to each LED by its respective current source. However, the physical implementation of the array and the operating conditions within which it operates each contribute to variations in the current supplied to the LEDs.

Prior Thayer et al. U.S. Pat. No. 5,099,192 ("Thayer"), which is incorporated herein by reference, teaches a power supply having a multiple number, such as five, of parallel current sources for biasing each LED in the print head. Each current source includes a P-channel driver FET in series with a P-channel control FET, and referred to as an "output-control pair." The driver FET has a source coupled to the positive power supply, a gate for receiving a reference voltage, and a drain. The control FET has a source coupled to the drain of the driver FET, a gate for receiving a control voltage, and a drain coupled to an LED. The drains of each control FET being connected in parallel increases effective channel width. The digital control signal at the gate of each control FET selectively enables or disables the respective output current from each output-control pair that is delivered to the LED. This allows the total current delivered to each LED to be controlled and matched to the characteristics of the LED being driven. However, once the effective width is established it remains fixed unless a new programming pattern is applied.

Thayer et al. describes two primary factors that contribute to the non-uniformity in the light output of the LEDs and teaches solutions to both. The first factor is the variation in the light output of the LEDs as a function of current between different wafer lots. These variations can be largely eliminated by sorting the LEDs according to their light efficiency. In addition to the variations within the LEDs, the current output of the power supplies can also vary from power supply to power supply due to processing variations. In Thayer et al. these variations can be partially compensated for by appropriately sizing and selectively enabling the individual current outputs of the output-control pairs.

Under constant operating conditions the power supply in Thayer et al. provides a substantially constant current that is suitably matched to the particular LED being driven. However, the current output can fluctuate with changes in the operating voltage at the drain of the control FET, i.e. the output of each current source. No provision is made in Thayer et al. to modify the digital settings at the gates of the control FETs, or otherwise compensate the power supply, in response to fluctuations in the output operating voltage.

Due to physical and economic considerations, each current source output $I_1$ through $I_N$ from the power supply is preferably multiplexed, between several LEDs, e.g., four LEDs per current source, as shown in FIG. 1. Multiplexing the current sources with multiplexers $MUX_1$ through $MUX_N$ reduces the total number of current sources that are required to drive all of the LEDs. Three multiplexers and four LEDs per multiplexer are shown in FIG. 1, but any number of multiplexers and LEDs can be used. Although the multiplexers are shown between the current sources and the LEDS, an equivalent circuit results from locating the multiplexers between the LEDS and the current return path, i.e., GND. In either case, the introduction of the multiplexing circuitry causes the voltage at the output of the current supply to fluctuate, which in turn affects the current source's ability to provide a constant current. In addition, there is a changing voltage associated with the current return path due to the changing number of LEDs injecting current into the finite impedance of the GND return path. This causes further fluctuation in the voltage at the output of the current source with a corresponding change in output current.

What is desired is a power supply for driving LEDs having multiple switched current outputs in which the current produced thereby is precisely controlled and is independent of fluctuations in the operating voltage at the current output coupled to the LEDs.

SUMMARY OF THE INVENTION

It is, therefore, an object of the invention to provide a constant current for driving a multiplexed LED load that is substantially independent of the operating voltage of the load.

Another object of the invention is to provide a power supply circuit having multiple current source outputs for driving LEDs in which the output driving current can be precisely matched to the characteristics of the LED.

One advantage of the present invention is that undesirable switching noise at the current outputs and throughout the circuit is reduced.

Another advantage of the present invention is that the output current is less dependent on variations in the supply voltage.

According to the present invention, a programmable power supply for driving LEDS is disclosed that includes a reference current leg and a number of output current legs. Both the reference current leg and the output current legs are further comprised of a plurality of parallel driver FET-control FET pairs, in which the driver and control FETs are connected in series. The driver FETs are biased by a reference voltage that provides a predetermined maximum output current. The control FETs are individually selected to provide a controlled output current. The individual control voltage is either a positive voltage, which disables the control FET, or a predetermined cascode voltage. The predetermined cascode voltage is chosen so that the output current is substantially insensitive to voltage fluctuations at the output.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Figure 1:
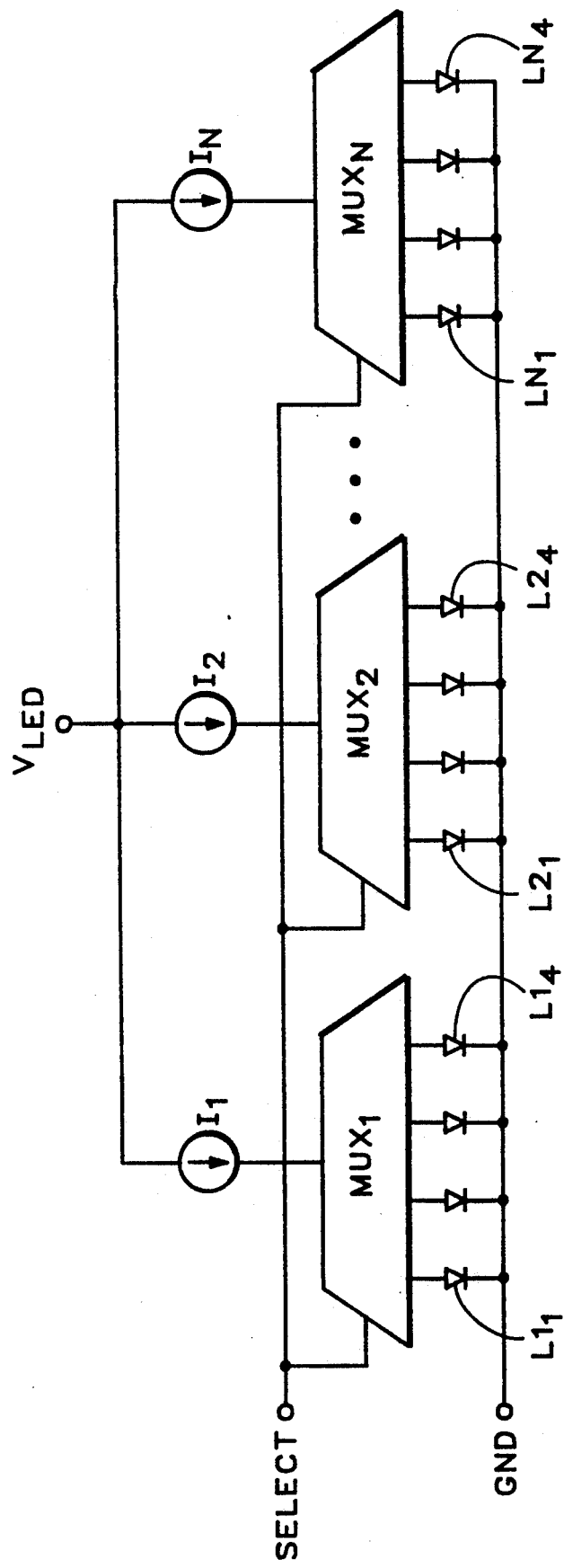
FIG. 1 is a schematic/block diagram showing a multiplexed LED array.

In FIG. 1, a power supply for an LED printhead is shown in which a row of current sources $I_1$–$I_N$ drives an array of LEDs. In a multiplexed LED printhead as shown in FIG. 1, multiplexer circuits $MUX_1$, $MUX_2$ through $MUX_N$ selectively distribute the output current to corresponding LEDs $L1_1$–$L1_4$, $L2_1$–$L2_4$, and $LN_1$–$LN_4$. Although four LEDs are shown coupled to the outputs of each multiplexer, any number can be used depending upon the application. The multiplexer circuitry allows a single output current to drive multiple LEDs, e.g., four, thereby reducing the total number of output drive circuits and associated interconnect required to drive all of the printhead LEDs. The multiplexer circuits are switched responsive to the programming of the data signal designated "SELECT". As previously stated, the multiplexers are shown between the current sources and the LEDs, but can be placed between the LEDs and ground, with the LEDs directly coupled to the current sources.

Figure 2:
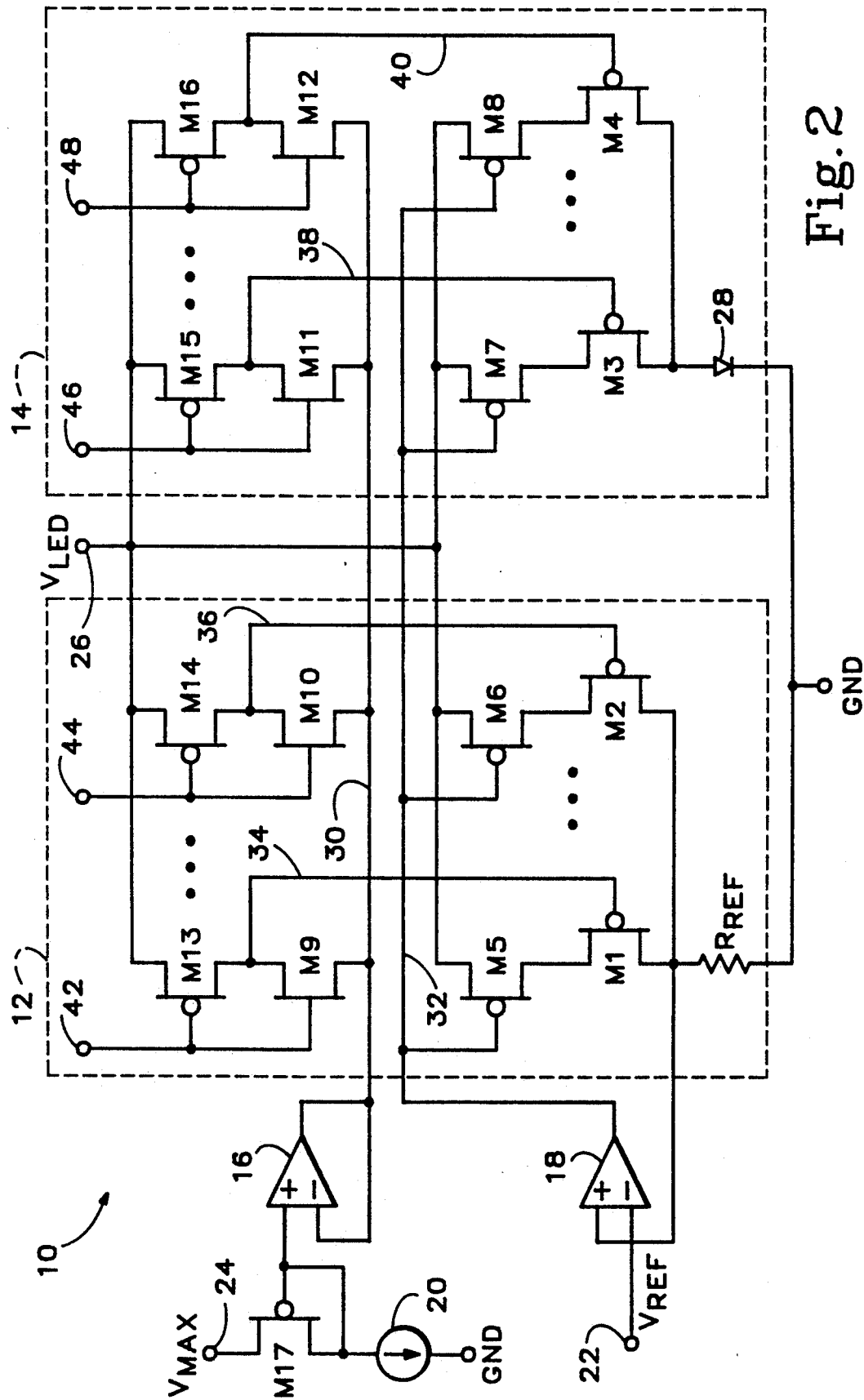
FIG. 2 is a schematic of the preferred embodiment of the LED power supply according to the present invention.

A schematic of the current power supply 10 of the present invention is shown in FIG. 2. For clarity, power supply 10 is shown having a single reference leg 12, and a single output current leg 14, for driving a single LED 28. The multiplexers, as well as other output current legs have been omitted. Reference resistance $R_{REF}$ can be either an internal or an external resistor, and LED 28 is normally located external to the integrated circuit containing power supply 10. All other circuitry, including operational amplifiers ("op-amps") 16 and 18, are desirably fabricated on the same integrated circuit.

The reference voltage $V_{REF}$ at circuit node 22 is applied to the inverting input of op-amp 18. Op-amp 18 drives the gates of driver FETs M5-M6 in the reference leg 12, as well as the driver FETs M7-M8 in the output leg 14. The feedback from resistor $R_{REF}$ to the positive input, and the high closed-loop gain enables op-amp 18 to establish substantially equal voltages at the positive and negative inputs, i.e., $V_{REF}$. Preferably, op-amp 18 has a low open-loop gain to provide stability and FETs M1, M2, M5, and M6 are designed to provide much of the loop gain. As a result, the reference voltage $V_{REF}$ is impressed across the reference resistance $R_{REF}$, producing a corresponding current through the reference resistance $R_{REF}$ equal to $V_{REF}/R_{REF}$. The source of each driver FET M5-M8 is coupled to the positive supply voltage $V_{LED}$ at circuit node 26. The value of the supply voltage is typically between 3.5 and 5 volts, but can be other voltages dictated by the application. The design and selection of the driver FETs is explained further in Thayer.

In series with each of the driver FETs M5-M6 of the reference leg are reference control FETs M1-M2. The drains of each of the control FETs are coupled together to the reference resistance $R_{REF}$ to form parallel branches of the reference leg. The control FETs act as switches, either enabling or disabling the corresponding driver-control branch, which in turn allows a corresponding portion of the total output current to flow through resistor $R_{REF}$.

The gate voltages 34, 36 of control FETs M1-M2 are provided by a corresponding switch section in the reference leg 12. Each switch section, or network, is an N-channel FET M9-M10 and a P-channel FET M13-M14 coupled in series. The source of each P-channel FET M13-M14 is coupled to the positive supply voltage $V_{LED}$ at circuit node 26 and the drain is coupled to the drain of the corresponding N-channel FET M9-M10, respectively. The drain of each N-channel FET M9-M10 is coupled to the output of an op-amp 16 configured as a buffer amplifier for receiving a predetermined cascode voltage. The generation of the cascode voltage is discussed in further detail below.

The gates of P-channel and N-channel FETs M9, M13 and M10, M14 in the switching section are coupled together and are driven by digital control signals 42, 44. The digital control signals have first and second logic states for controlling the flow of current in the reference current leg 12. In the first logic state, signal 42 or 44 is at a logic high, the N-channel FET is enabled and the P-channel FET is disabled, thereby passing the predetermined cascode voltage at the source of the N-channel FET (conductor 30) onto the gate of the corresponding control FET. In the second state, when the signal is at a logic low, the P-channel FET is enabled and the N-channel FET is disabled, thereby passing the positive supply voltage $V_{LED}$ onto the gate of the control FET. In the second state, the positive supply voltage acts as a disabling voltage to the P-channel control FET, effectively eliminating the corresponding driver-control branch from the leg. The use of these two states allows the effective W/L ratio of the reference leg to be changed while maintaining a constant reference current $I_{REF}$ which results in a corresponding change in the concomitant driver FET gate voltages on node 32. In an alternative embodiment of the switching network, additional opposite polarity FETs can be placed in parallel with the FET switches M9 and M10 to reduce series resistance. Numerous other FET switching network arrangements can be used to switch either $V_{LED}$ or the voltage on node 30 onto node 34.

The cascode voltage is generated by the circuit including op-amp 16, FET M17, and current source 20. Op-amp 16 is configured as a buffer amplifier to buffer the voltage generated at the coupled gate and drain of diode-configured P-channel current-setting FET M17. The current-setting FET M17 is biased by current source 20 to produce a corresponding voltage drop across the source and the coupled gate and drain. The bias current is chosen so that the current density ratio of FET M17, i.e., I/(W/L), is greater than the current density ratio of the control FETs M1-M4. The source of FET M17 is coupled to a predetermined maximum voltage level, $V_{MAX}$, slightly greater than the maximum load voltage expected at the output node of the output leg, i.e., the drain of FETs M3-M4. The P-channel FET M17 provides temperature and threshold compensation for the cascode voltage that controls FETs M1-M4. The constant $V_{MAX}$ voltage at circuit node 24 is reduced by a P-channel threshold voltage drop and the drain-to-source voltage drop $V_{DSAT}$ across current-setting FET M17. After passing through the switch network substantially unaltered, the one drain-to-source voltage drop $V_{DSAT}$ is restored by the drain-to-source voltage of transistors M1–M4. Thus, whenever the control FETs are on, the voltage at the sources of FETs M1–M4 is constant and substantially equal to $V_{MAX}$ plus $V_{DSAT}$, assuring adequate drain-to-source operating voltage with temperature.

In principle, the cascode voltage produced on conductor 30 biases the control FETs M1–M4 towards the high impedance saturation conduction region. The gate voltage of the control FETs is lower than a full digital voltage swing. The lower gate-to-source voltage moves the operating point towards the saturation conduction region, where the current is less dependent on drain-to-source voltage. Depending upon the value of the supply voltages used, the control FETs may not be operating fully in the saturation conduction region, but on the "soft-knee" transition between the linear and saturation conduction regions. Nonetheless, a significant benefit in the control of output current is still achieved.

The output 32 of the op-amp 18 further drives the gates of a plurality of P-channel driver FETs M7–M8 in output current leg 14. The output leg is a scaled or ratioed mirror image of the reference leg. For the same size and number of driver FETs M7–M8, the output leg provides the same current as the reference leg. The basic current source operation is further explained in Thayer. The voltage at the op-amp output 32 biases the gates of the driver FETs M7–M8, to which it is coupled, to produce a corresponding current in the output leg 14. The output driver FETs M7–M8 are sized to accommodate variations in the LED light efficiency as taught in Thayer. As in the reference leg 12, the drain of each driver FET is coupled to the source of a corresponding control FET, to form a driver-control branch. The source of the driver FETs are coupled to the positive supply voltage $V_{LED}$ at circuit node 26. The gates of control FETs M3–M4 are driven by an identical switch network as used in reference leg 12. However, each output switch network has its own corresponding control signal 46, 48 for selecting between the disabling voltage or the predetermined cascode voltage. The disabling voltage and the cascode voltage are the same as discussed above with respect to the reference current leg 12.

The precise value of the cascode voltage level is determined by the maximum voltage that is present at the drains of the control FETs M3–M4, i.e., the output node. In a typical multiplexed LED printhead, there are several components that dictate the maximum voltage at the output node. The LED itself has a maximum voltage drop of 1.9 volts, the multiplexing circuitry adds an additional 0.5 volt, and the finite impedance of the ground plane as well as other interconnect impedance can also contribute another 0.5 volt drop. Therefore, for a typical LED printhead, the maximum voltage that can appear on the output node is 2.9 volts. The maximum voltage, of course, varies with each application and the selection of the multiplexer circuitry, layout considerations, and type of LED used.

One advantage of the lower cascode voltage used in the present invention is that switching noise produced at the current outputs and throughout the circuit is reduced. The noise produced by the switching of the control FETs and the parasitic capacitances is reduced since the voltage differential on circuit nodes 34, 36, 38, and 40 is reduced. The lower noise is especially advantageous if the power supply 10 is fabricated on an integrated circuit together with many other functional blocks that are adversely affected by switching noise. Another advantage is greater power supply noise rejection. The analysis of power supply rejection is very similar to the analysis of current dependence with respect to output voltage. In general, the control and driver FET pair provides a constant output current despite changes in the total voltage across both transistors.

Having illustrated and described the principles of the invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A power supply having multiple controlled current outputs for driving LEDs in an LED printhead, each current output comprising:

a plurality of driver FETs each having a source coupled to a source of power supply voltage, a gate, and a drain, wherein the gates of the driver FETs are coupled together to receive an output reference voltage; and a plurality of control FETs each having a source coupled to the drain of a respective driver FET, a gate for receiving an individual output current control voltage, and a drain, wherein the drains of the control FETs are coupled together to form a current output and the control voltage has a first, disabling voltage level for disabling the control FET and a second, predetermined cascode voltage level for establishing the operating point of the control FET out of the linear region and tending towards the high output impedance saturation conduction region.

2. A power supply as in claim 1 further comprising means for generating the predetermined cascode voltage.

3. A power supply as in claim 2 in which the generating means comprises:

a current setting FET having a source for receiving a predetermined maximum load voltage, a gate, and a drain;

a current source coupled to the gate and drain of the FET; and a buffer amplifier having an input coupled to the gate and drain of the FET and an output for providing the cascode voltage.

4. A power supply as in claim 3 in which the current density through the current-setting FET is greater than through each of the control FETs.

5. A power supply as in claim 1 further comprising means, for generating the output reference voltage.

6. A power supply as in claim 5 in which the generating means comprises:

an operational amplifier having a negative input for receiving a predetermined input reference voltage, a positive input, and an output for providing the output reference voltage;

a plurality of driver FETs each having a source coupled to the source of power supply voltage, a gate, and a drain;

wherein the gates of the driver FETs are coupled together to receive the output reference voltage;

and a plurality of control FETs each having a source coupled to the drain of a respective driver FET, a gate for receiving an individual reference current control voltage, and a drain, wherein the drains of the control FETs are coupled together to form a current output and the control voltage has a first, disabling voltage level for disabling the control FET and a second, predetermined cascode voltage level for establishing the operating point of the control FET out of the linear region and tending towards the high output impedance saturation conduction region.

7. A power supply as in claim 5 further comprising means for generating the individual output and reference current control voltage such that each control voltage is switchable between the first and second voltage levels.

8. A power supply as in claim 7 in which the switching means comprises a plurality of switching sections, each switching section comprising:

a first FET of a first polarity type having a source coupled to the source of supply voltage, a gate, and a drain; and a second FET of a second polarity type having a source for receiving the predetermined cascode voltage, a gate coupled to the gate of the first FET for receiving a digital switching voltage, and a drain coupled to the drain of the first FET for providing the control voltage to the gate of the corresponding control FET.

* * * * *